April 26, 1938.   R. H. DRAEGER   2,115,014

READING MACHINE INDEXING MECHANISM

Filed April 20, 1937

INVENTOR.
Rupert H. Draeger.
BY
ATTORNEY

Patented Apr. 26, 1938

2,115,014

UNITED STATES PATENT OFFICE 2,115,014

READING MACHINE INDEXING MECHANISM

Rupert H. Draeger, United States Navy

Application April 20, 1937, Serial No. 137,964

3 Claims. (Cl. 88—28)

(Granted under the act of March 3, 1883, as amended April 30, 1928; 370 O. G. 757)

This invention relates to film indexing mechanisms and more particularly to indexing mechanisms adapted to be used on reading machines such as shown and described in my copending applications Serial No. 49,757 filed November 14, 1935, and Serial No. 119,098 filed January 5, 1937. It is, however to be understood, that the use of the indexing mechanism of the present invention is not to be limited to these specific reading machines, but that it may be used on other devices as well as similar reading machines.

Reading machines of the kind mentioned above have some means for moving and guiding film strip carrying images to be examined, and these means include a device for holding the film in proper position for projecting the image onto a viewing screen while the film is at rest. This device is called a film gate.

The primary object of the present invention is to provide an improved indexing mechanism to be used with a reading machine and operable by means of a crank.

A further object of the invention is to provide an indexing mechanism adapted to advance the film in a reading machine at will in either direction.

Another object of the invention is to provide an indexing mechanism including means for opening the film gate and holding it open while the film is being moved in either direction.

Another object of the invention is to provide an indexing mechanism permitting the film gate to be closed when the actuation of the indexing mechanism ceases.

A further object of the invention is to provide an indexing mechanism in which the driving power of the crank will be transmitted to one of the spools supporting the film while the other spool is free to rotate.

Still a further object of the invention is to provide an indexing mechanism selectively transmitting the driving power of the crank to one of the spools in accordance with the direction of rotation of the crank, the spool not being driven always being in position to rotate freely.

Other objects of the invention not specifically mentioned may be easily ascertained and understood from the following description in connection with the accompanying drawing forming a part thereof. It is however to be understood that the present invention is not to be restricted to the exact construction and formation shown and described but is to be limited only by the spirit and scope of the claims appended hereto.

Figure 1:
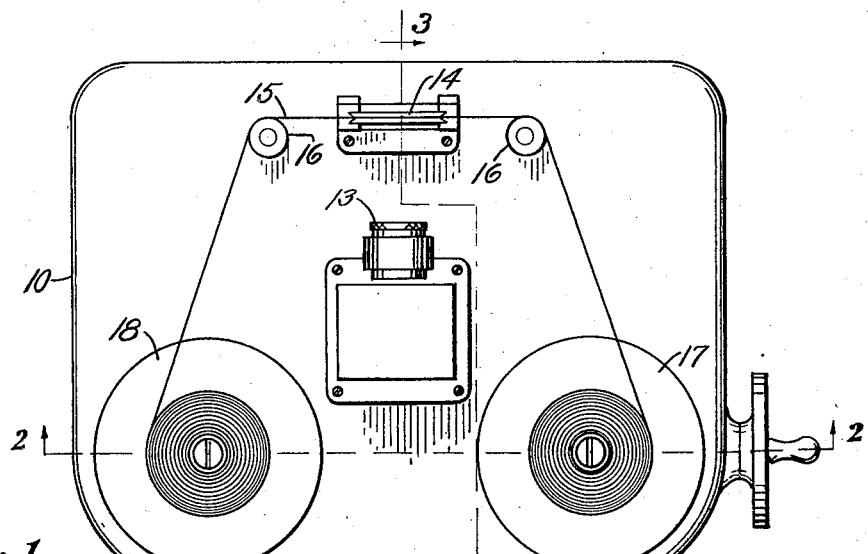
Fig. 1 is a plan view of a head of a reading machine showing a pair of film spools, a film gate, a film, parts of an optical system and a crank mounted on and carried by said head.
Figure 2:
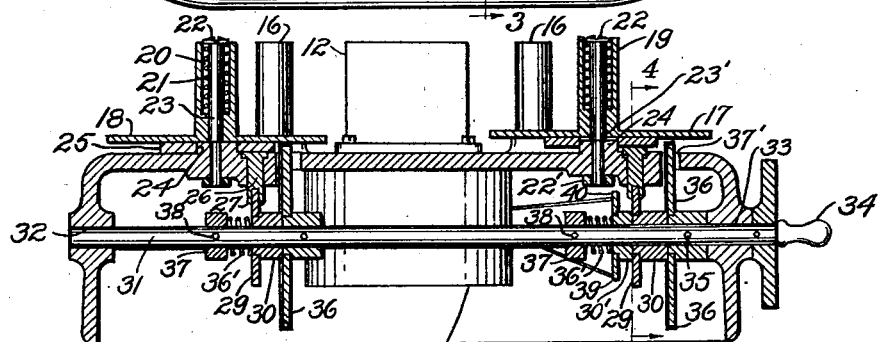
Fig. 2 is a sectional view taken on line 2—2 of Fig. 1, the film being omitted.

From a head 10 of a reading machine, a circular hollow depending neck 11 extends downwardly as shown in Fig. 2 for mounting the head on a reading machine housing. A reflecting prism 12 is mounted on said head directly over the neck 11. An objective lens 13 passes light rays through film gate 14 and film 15 to the prism 12 which reflects them into and through the neck 11.

The head 10 is provided with two upwardly extending bosses 24 surrounded by spacer rings 25. A spindle 23, extends through a hole in each boss 24 and has a shoulder 23' resting on the surface of each boss 24. Each spindle is provided with a screw head 22, for a purpose to be explained later. The ends of the spindles 23, which extend through the top plate of the head 10, are threaded and nuts 22' hold the spindles in place.

Two single flanged spools or spindles 17 and 18, having hubs 19, are adapted to be rotatably mounted on the spindles 23. The hub portions 19 are counterbored at 20 and helical compression springs 21 are arranged in said counterbores. The screw heads 22 of the spindles 23 hold the springs 21 securely in their places. The film 15 extends from spool 17 over a guide roller 16 through the film gate 14 and over a second guide roller 16 to the second spool 18.

A control shaft 31 is rotatably journaled in the side walls of head 10, as indicated at 32 and 33 in Fig. 2. A crank handle 34 is fixedly mounted on one end of shaft 31 for rotating said shaft. Driving-discs or driving-wheels 36 are rigidly mounted on shaft 31 as indicated at 35, extend through slots 37' and are adapted to frictionally engage the spools 17 and 18 respectively.

Adjacent to the driving-discs 36 hubs 30, rigidly connected with cam wheels 29, are rotatably mounted on the control shaft 31. Spiral compression springs 36' surrounding the shaft 31 and abutting one end of collars 37, which are fastened to the shaft 31 as shown at 38, press said hubs into frictional contact with the discs or wheels 36.

Between one of the collars 37 and the corresponding hub 30 another hub 30' is rotatably arranged on the shaft 31, so that the spring 36' on that side will force the second hub 30' and the first hub 30 into frictional contact.

The film gate 14 has a pivotally mounted portion 44 from which a lever arm 43 extends downwardly. A tension spring 45 is fastened with one of its ends to the wall of head 10 and with the other end to arm 43 pulling this arm toward the head wall and tending to hold the film gate in closed position.

Flexible members 41 and 42 are each fastened by one end to the lever arm 43. The other end of member 41 is fastened to a lug 39 and the other end of member 42 to lug 40, the two lugs extending from the second hub 30'.

Plungers 26 are arranged underneath the spacer rings 25 and are adapted to slide in openings provided in the top of head 10. The lower ends of the plungers are forked as indicated at 27 and are riding on a cam notch 28 in the cam wheel 29.

The indexing mechanism as shown in the drawing and described above operates as follows:

When the driving-shaft 31 is rotated by means of the crank handle 34, hub 30' and the lugs 39 and 40 extending therefrom are being rotated therewith. One or the other of the flexible members 41 and 42 respectively will be pulled to the right in Fig. 3, the selection of the member depending on the direction of rotation of shaft 31. This flexible member will pivot the lever arm 43 toward the right thereby swinging the film gate portion 44 into open position permitting the film 15 to travel freely through the film gate.

Figure 4:
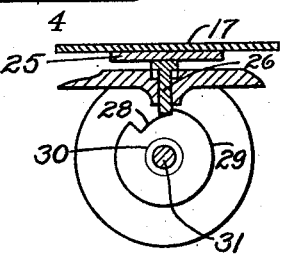
Fig. 4 is a sectional view taken on line 4—4 of Fig. 2.

At the same time the two cam wheels 29 are being rotated. The cam notches 28 in said wheels are arranged so that the one plunger 26 riding in said notch is in the position shown in Fig. 4 and at the right hand end of Fig. 2, i. e. pushed upwardly, thereby lifting the spacer-ring 25 and the spool resting on said ring, and spacing said spool from the driving-wheel 36, breaking the frictional engagement between these two parts. The other plunger riding in the other cam notch is in lowered position permitting the spring 21 on that side to push the spool 18 into frictional engagement with the corresponding driving-wheel 36. Further rotation of the shaft 31 turns the driving-wheels 36 only, the hubs 30 and 30' slipping on the shaft because of being connected therewith only through the friction clutch formed by the collar 37, spring 36' and drive-wheel 36. Hence, while crank handle 34 is being turned in one direction the film gate will be held open, and the spool 17 will be held out of frictional contact in relation to the corresponding driving-wheel 36 while spool 18 is driven. Upon reversal of the direction of rotation of the shaft 31 the plungers 26 will change their positions so that spool 18 will be lifted away from its driving-wheel and spool 17 will be forced into frictional engagement with its driving-wheel so that the film 20 wound on the spools 17 and 18 will now travel in the opposite direction. The film gate 14 will be held in open position during operation regardless of which spool is being driven.

Figure 3:
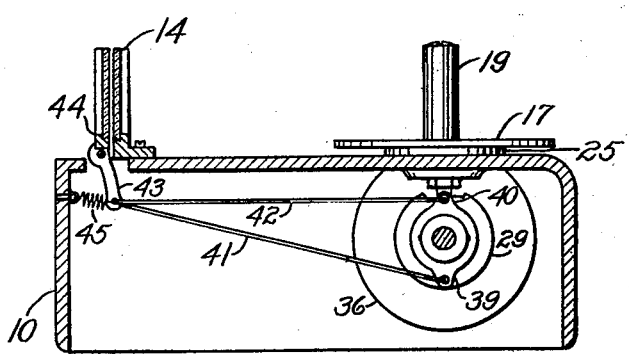
Fig. 3 is a sectional view taken on line 3—3 of Fig. 1 showing the film gate opening and closing means, the film being omitted.

When the rotary movement of shaft 31 ceases, the spring 45 will center the lugs 39 and 40 as shown in Fig. 3 and will pivot the movable film gate portion 44 into closed position holding the film therein in correct position for projection.

The invention described herein may be manufactured and used by or for the Government of the United States of America for governmental purposes without the payment of any royalties thereon or therefor.

Having thus described the construction, operation and use of my invention what I claim as new and desire to secure by Letters Patent is:

1. A film indexing mechanism for reading machines comprising a reading machine head, a control shaft journaled in said head, a pair of spindles supported on said head and adapted to receive film spools thereon, driving wheels secured on said shaft in proximity of said spindles, means tending to bring said spindles into engagement with said wheels, lifting means for said spindles to lift them out of operative relation with the associated driving wheel, cams rotatably mounted on said shaft in operative relation with said lifting means, the cam faces being so cut that the lifting means is actuated during the clockwise rotation of the shaft to move one spindle out of operative relation with the associated driving wheel, and to move the other spindle out of operative relation with the associated driving wheel when the shaft is rotated in the opposite direction, a film gate through which said film passes and adapted to be opened and closed to permit the advance of the film or to grip it against movement, means for opening and closing said film gate, and means controlled by said shaft to actuate the last mentioned means once during each revolution of said shaft during its clockwise as well as counter-clockwise rotation.

2. A film indexing mechanism for reading machines, comprising a reading machine head, a control shaft journaled in said head, a pair of spindles supported on said head and adapted to receive film spools thereon, driving wheels secured on said shaft, said head being slotted and said wheels extending through the slots in the head in proximity of said spindles, means tending to bring said spindles into frictional contact with said wheels, a plunger slidably mounted beneath each spindle to lift it out of operative relation with the associated driving wheel, cams rotatably mounted on said shaft one beneath each plunger in operative relation therewith, friction means for operatively connecting the cams with said shaft, the cam faces engaged by the plunger being so cut that one of the plungers is raised during the clockwise and the other during the counter-clockwise rotation of the shaft, only one of said cams at a time being adapted to raise the associated plunger once during each revolution of the shaft, and thereby to move one spindle out of operative relation with the associated driving wheel, when the shaft is rotated in one direction and the other when the shaft is rotated in the opposite direction.

3. A film indexing mechanism for reading machines, comprising a reading machine head, a control shaft journaled in said head, a pair of spindles supported on said head and adapted to receive film spools thereon, driving wheels secured on said shaft, said head being slotted and said wheels extending through the slots in the head in proximity of said spindles, means tending to bring said spindles into frictional contact with said wheels, a plunger slidably mounted beneath each spindle to lift it out of operative relation with the associated driving wheel, cams rotatably mounted on said shaft one beneath each plunger in operative relation therewith, friction means for operatively connecting the cams with said shaft, the cam faces engaged by the plungers being so cut that one of the plungers is raised during the clockwise and the other during the counter-clockwise rotation of the shaft, only one of said cams at a time being adapted to raise the associated plunger once during each revolution of the shaft, and thereby to move one spindle out of operative relation with the associated driving wheel, when the shaft is rotated in one direction and the other when the shaft is rotated in the opposite direction, a film gate through which said film passes and adapted to be opened and closed to permit the advance of the film or to grip it against movement, a spring-pressed arm for opening and closing said film gate, and a connection between said shaft and arm to actuate the latter against the tension of said spring once during each revolution of said shaft during its clockwise as well as counter-clockwise rotation.

RUPERT H. DRAEGER.